United States Patent [19]

Mitchell

[11] 4,250,594
[45] Feb. 17, 1981

[54] FISH SKINNING MACHINE

[76] Inventor: Ronald A. Mitchell, 887 Wesson Ave., Quincy, Mass. 02169

[21] Appl. No.: 33,959

[22] Filed: Apr. 27, 1979

[51] Int. Cl.³ .................................... A22C 25/17
[52] U.S. Cl. ......................................... 17/62; 99/589
[58] Field of Search ............... 17/21, 50, 62; 99/589, 99/584, 588

[56] References Cited

U.S. PATENT DOCUMENTS

| | | | |
|---|---|---|---|
| 2,215,114 | 9/1940 | Baader et al. | 17/62 X |
| 2,605,495 | 8/1952 | Daniels | 17/21 X |
| 2,806,245 | 9/1957 | Bartels | 17/62 |
| 3,739,428 | 6/1973 | Bartels et al. | 17/62 |

FOREIGN PATENT DOCUMENTS

| | | | |
|---|---|---|---|
| 1454077 | 3/1969 | Fed. Rep. of Germany | 17/62 |
| 1034825 | 4/1953 | France | 17/62 |

*Primary Examiner*—Willie G. Abercrombie
*Attorney, Agent, or Firm*—Robert T. Gammons

[57] ABSTRACT

This invention relates to fish skinning machines wherein fish are delivered tail-first to the nip between a feed roll and the pinch roll which pulls the fish downwardly toward the cutting edge of a cutter for separating the skin from the flesh and especially to improvements in the delivery of the fish to the nip between the feed roll and the pinch roll, positioning and operation of the cutter, adjustment of the cutter with respect to the feed roll, clearing the ends of the cutter, gasketing the reciprocating cutter shaft to prevent loss of oil and ingress of water and attachment of the feed conveyor as a separable unit to facilitate repair and adjustment.

20 Claims, 7 Drawing Figures

FISH SKINNING MACHINE

BACKGROUND OF THE INVENTION

Fish skinning machines are old in the art and one of the principal disadvantages has been the tendency for the fish to drop down into the space between the discharge end of the feed conveyor and the feed roll and so not be carried forward by the feed roll into the nip between the feed roll and the pinch roll and drawn thereby into engagement with the cutting knife. Such expediences as have been designed to prevent this have not so far been especially successful. Another problem has been to make sure that the cutting knife be brought into engagement with the fish at the proper point to effect separation of the skin from the flesh without waste for whatever length fish are being handled without having to make mechanical adjustments. Still another problem has arisen from the fact that the cutting knife is reciprocal and the reciprocal movement of the knife shaft through its supporting bearings produces a pumping action which pumps the oil out of the gear cases and pumps water into them. Still another disadvantage of prior machines resides in the fact that the cutting knife must be manually adjusted to take up for wear and, finally, in such machines as are known, the feed conveyor is part of the main frame of the machine, requiring that the machine be disassembled to a considerable extent to enable repairing or adjusting the conveyor. It is the purpose of this invention to provide a fish skinning machine so designed as to eliminate the aforesaid disadvantages and, by such elimination, to provide an efficiently operating, easy to repair machine.

SUMMARY OF THE INVENTION

As herein illustrated, the machine comprises a feed roll, a knife supported with its cutting edges close to the surface of the feed roll and parallel thereto and defining therewith a narrow space between the feed roll and the knife, conveyor means for delivering fish tail-first to the surface of the feed roll, a pinch roll cooperable with the feed roll to grip the tail end of the fish and pull the fish downwardly toward the cutting edge of the knife, means for moving the cutting edge of the knife into engagement with the flesh side of the fish as the tail is pulled downwardly by the feed and pinch rolls to strip the flesh from the skin and means for discharging jets of water against the underside of the fish as it travels from the discharge end of the conveyor means onto the surface of the feed roll. There is a discharge conveyor for receiving the flesh stripped from the skin. The means for moving the cutting edge of the knife into engagement with the tail of a fish is actuated by the reactive torque imparted to the feed roll when the tail end of a fish enters the bight between the feed roll and the pinch roll. The feed roll, pinch roll and knife are mounted to the shafts and there is a supporting frame including bearings rotatably supporting the feed roll and pinch roll, bearings rotatably and reciprocably receiving the knife shaft and sealing glands encompassing the ends of the knife shaft where they extend through their supporting bearings. The means for moving the cutting edge of the knife into engagement with the flesh surface of the fish as the tail of the fish enters the nip between the feed roll and the pinch roll comprises kinematic linkage connecting the feed roll to the cutter shaft which includes means for adjusting the position of the cutting edge of the knife relative to the surface of the feed roll to provide for skinning fish of different lengths without waste. There is also means for adjusting the pinch roll relative to the surface of the feed roll to compensate for wear. The conveyor has its own supporting frame which is detachably connected to the main frame of the machine provided with articulated portions so as to enable disposing the receiving and discharge ends of the conveyor belt at appropriate angles for loading and discharge. There is also means associated with the conveyor frame for tensioning the conveyor belt and for maintaining the drive for the belt for any angular position of the portions of the belt relative to each other.

The invention will now be described in greater detail with reference to the accompanying drawings, wherein.

Figure 1:
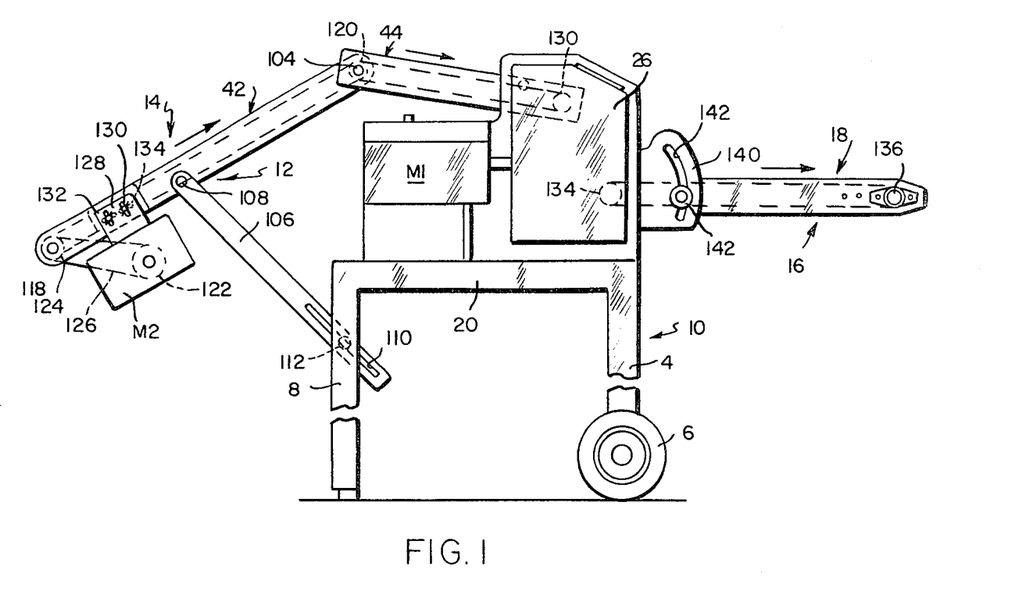
FIG. 1 is an elevation as seen from one side of the machine.
Figure 2:
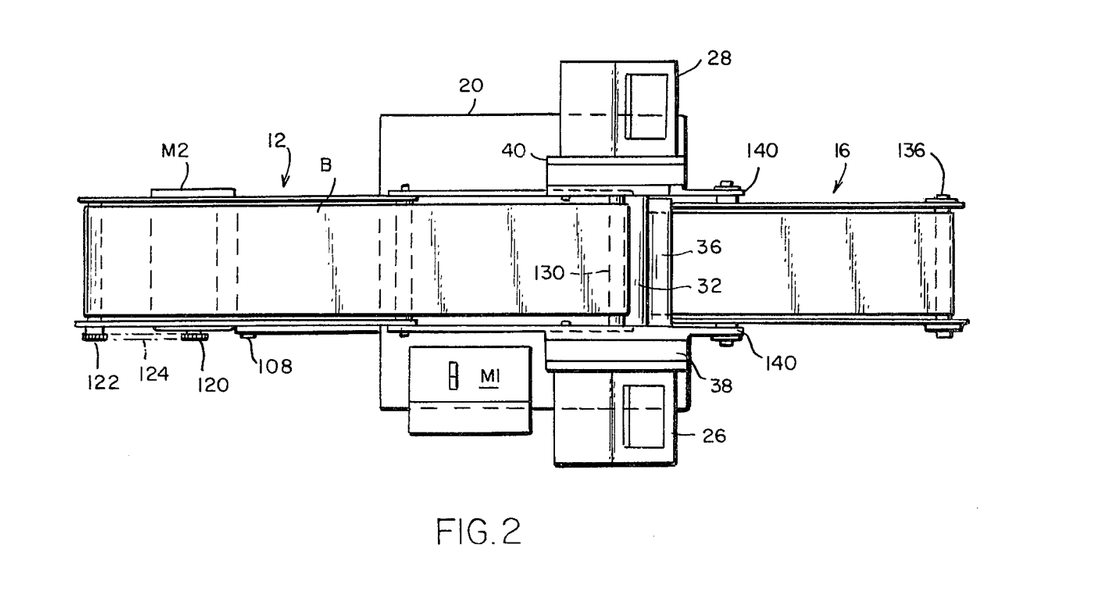
FIG. 2 is a plan view of the machine.

Referring to the drawings, FIGS. 1 and 2, the apparatus comprises a main frame 10 which supports the skinning instrumentalities and driving means therefor, a secondary frame 12 which supports and removably attaches a conveyor 14 to the main frame for delivering fish to be filleted to the skinning instrumentalities and a third frame 16 which supports a discharge conveyor 18 on the main frame.

The main frame 10 comprises a horizontal structure 20 with spaced parallel side walls 22—22 standing upwardly therefrom to the inner sides of which are attached bearing plates 24—24 and to the outer sides of which are attached housings 26,28. The structure 20 is supported at its forward side by a pair of vertical, transversely-spaced legs 4—4 with wheels 6—6 at their lower sides and at the rear side by a pair of vertical, transversely-spaced legs 8—8. The main frame 10 as thus constructed can be easily moved from place to place and yet is stable enough in use so that it need not be lagged to the floor. The two housings 26,28 contain the drive means for the skinning instrumentalities which are mounted between the bearing plates as will now be described.

Figure 6:
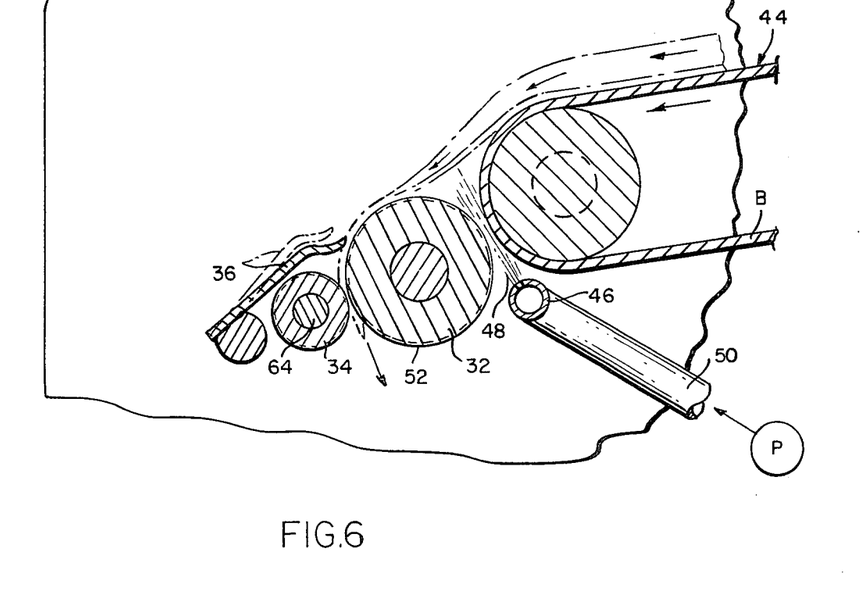
FIG. 6 is a section taken on the line 6—6 of FIG. 5 showing the relative positions of the forward end of the conveyor, feed roll and water air jets.
Figure 7:
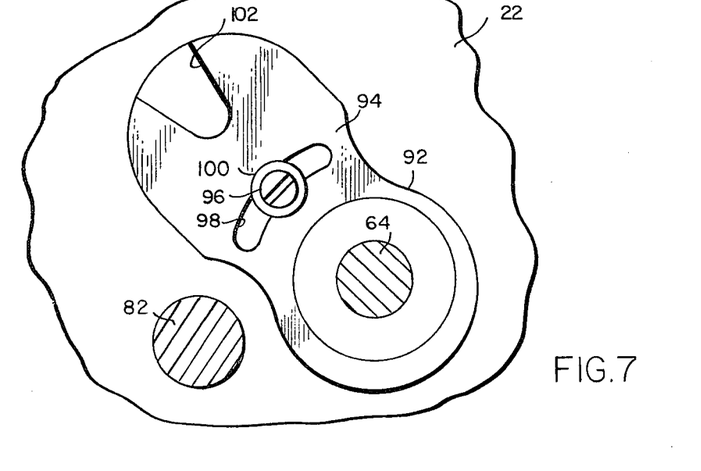
FIG. 7 is a fragmentary elevation taken on the line 7—7 of FIG. 3.

Specifically, the skinning instrumentalities comprise, FIG. 6, a feed roll 32, a pinch roll 34 and a knife 36. The feed roll 32, the pinch roll 34 and the knife 36 are all journaled in the bearing plates 24—24 attached to the side walls 22—22.

The fish that are to be skinned are delivered to the top surface of the feed roll 32 by the conveyor 14. The conveyor 14 is supported by an articulated frame, the details of which will be described hereinafter, so as to have an upwardly-inclined portion 42 upon which the fish are placed by attendants and a downwardly-inclined portion 44 which receives the fish from the upwardly-inclined portion 42 and delivers them to the top of the feed roll as shown in FIG. 6. In order to deposit the fish onto the upper side of the feed roll 32 without the forward tail ends falling down between the discharge end of the conveyor and the feed roll, which has been a considerable problem in the past, there is provided means for delivering jets 48 of water upwardly between the delivery end of the conveyor and the feed roll 32 as shown in FIG. 6. The water jets are provided for by a horizontal length of pipe 46 placed transversely of the apparatus parallel to the axis of the feed roll in a position to projects jets 48 of water upwardly between the forward end of the conveyor portion 44 and the rear side of the feed roll 32, the effect of which is to prevent the leading end of the fish from following the surface of the conveyor downwardly by holding it up as it crosses the gap between the conveyor and the feed roll. To promote forward movement of the leading end of the fish with the feed roll, the surface of the latter is provided with knurling 50. As the leading end of the fish travels forwardly on the surface of the feed roll 32, it moves downwardly over the forward face of the feed roll into the bight between the feed roll and the pinch roll 34 and is pulled down between the feed roll and the pinch roll. The entrance of the tail end of a fish into the nip imparts a reactive force to the feed roll which is converted by linkage which will be described hereinafter to move the skiving knife from a position spaced from the surface of the feed roll to a position of engagement with the flesh surface of the fish traveling downwardly on the surface of the feed roll to commence to remove the flesh from the skin. The skin travels downwardly between the feed roll and the nip roll to a place of discard and the flesh travels over the upper surface of the knife and is deposited on the discharge conveyor 18.

Figure 3:
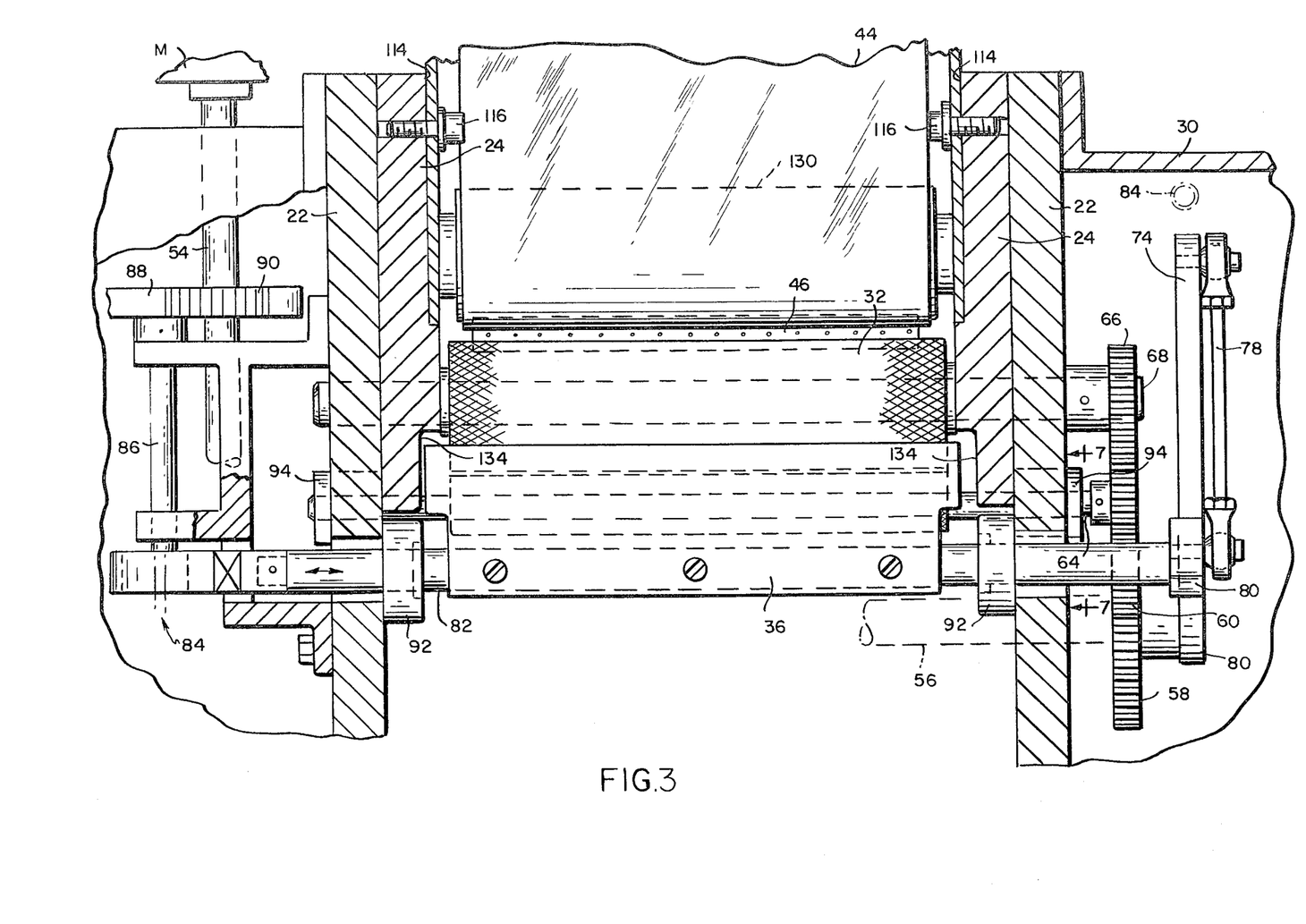
FIG. 3 is a fragmentary front elevation partly in section to larger scale showing the relative positions of the delivery end of the conveyor, the feed roll and the knife.

Referring now to the drive, FIG. 3, there is a motor M mounted on the structure 20 from which extends the main drive shaft 54. The main drive 54 through a worm gear not shown effects rotation of a shaft 56 which is journaled in the plates 24—24 extending horizontally across the machine from the housing 26 at the one side to the housing 28 at the other side. Within the housing 30, FIGS. 4 and 5, there is mounted on the shaft 56 a drive gear 58. The drive gear 58 meshes with an idler 60 and this, in turn, meshes with a gear 62 fast to a shaft 64 on which the pinch roll 34 is mounted. The gear 62 meshes, in turn, with a gear 66 fixed to a shaft 68 on which the feed roll 32 is mounted. Thus, the main drive provides through the meshing gears 58, 60, 62 and 66 the drive for rotating the feed roll 32 and the pinch roll 34.

Figure 4:
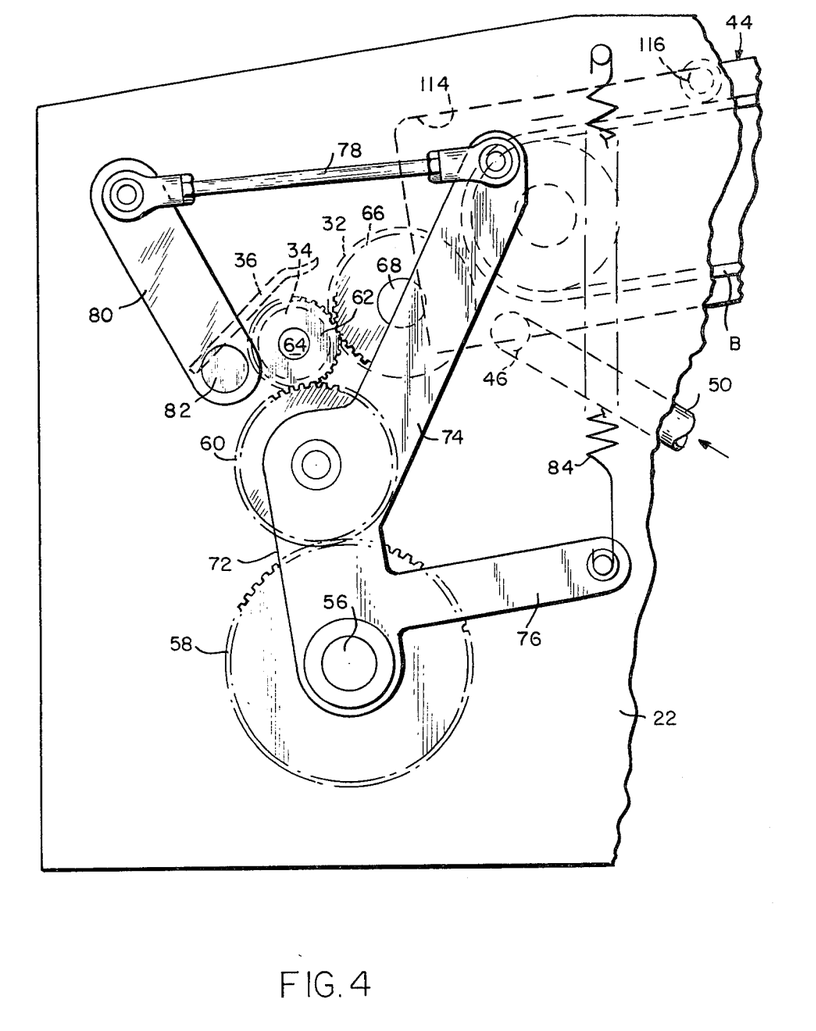
FIG. 4 is a fragmentary elevation showing the driving chain for the feed roll, pinch roll and the knife showing the latter in its retracted position.
Figure 5:
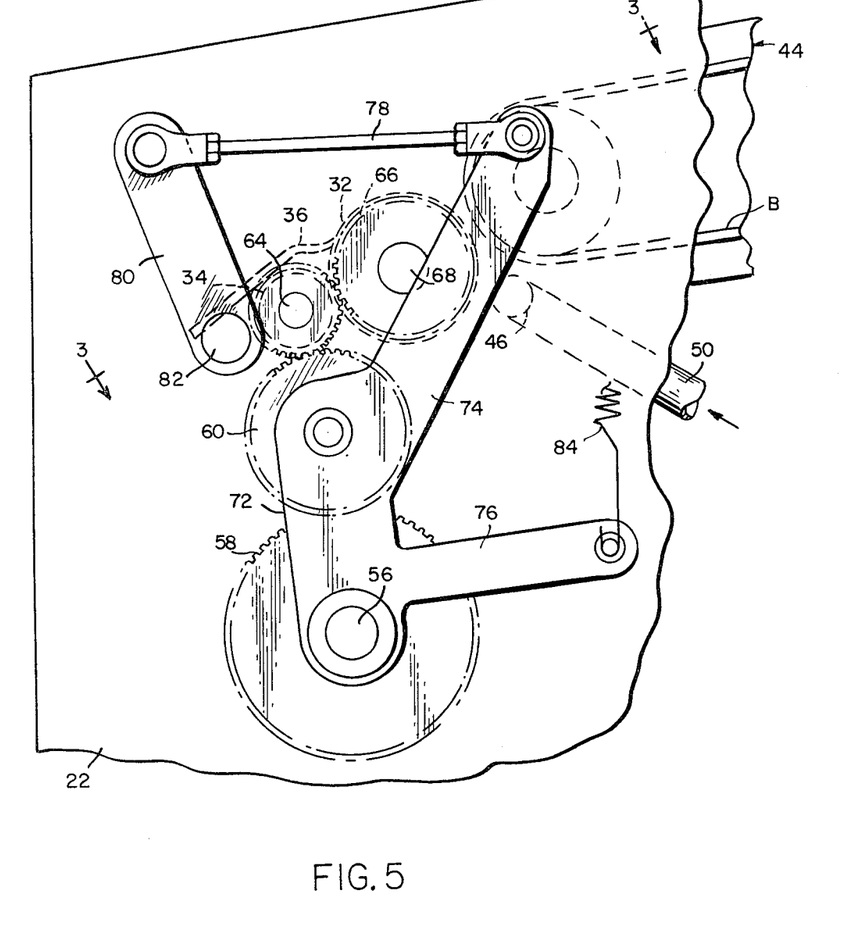
FIG. 5 is a view similar to FIG. 4 showing the knife in its operative position.

As previously indicated, the knife is moved into engagement with the flesh side of the fish just after the leading end of the fish enters the bight between the feed roll and the pinch roll and this is effected by linkage comprising a rocker 70, FIGS. 4 and 5 provided with an arm 72, an arm 74 and an arm 76. The arm 72 is pivotally mounted on the shaft 56 and has rotatably mounted on it intermediate its ends the idler 60. A rod 78 is pivotally connected at one end to the arm 74 and at its other end to one end of an arm 80, the opposite end of which is fixed to a shaft 82 journaled at its opposite ends in the plates 24—24 parallel to the axis of rotation of the feed roll for rotation and for oscillation longitudinally of its axis. A spring 84 is connected at one end to the arm 76 and at its other end to a fixed point within the housing 30 so as to urge the rocker 70 in counterclockwise direction as shown in FIG. 5. Such counterclockwise rotation effects a counterclockwise rotation of the arm 80 and the shaft 82 so as to hold the knife 36 retracted from the surface of the feed roll. When the tail end of a fish is deposited on the surface of the feed roll and enters the nip between the feed roll and the pinch roll, it produces a retarding force which is transmitted from the feed roll to the pinch roll and from the pinch roll to the idler roll 60 so as to cause the rocker 70 to walk around the surface of the drive gear 58 in a clockwise direction. Such clockwise movement effects a corresponding clockwise movement of the arm 80 and of the shaft 82 so as to move the knife into operative position with respect to the surface of the feed roll, FIG. 5. As soon as the reactive force on the feed roll is removed as by a fish having been discharged, the knife is retracted so as to permit the leading end of the next fish as it is deposited on the surface of the feed roll to move between it and the surface of the feed roll to become engaged between the feed roll and the pinch roll before the knife is again moved into operative position.

The knife 36 is not only reciprocated toward and from the feed roll, but is oscillated transversely of the feed roll and to this end, as shown in FIG. 3, there is provided cam means 84 in the housing 26 which is driven by a shaft 86 provided with a gear 88 which meshes with a gear 90 secured to the main drive shaft 54. The knife shaft 82 is oscillated continuously by said cam means during the operation of the machine. Because of this oscillation, there is a tendency for water to be pumped into the housing 26 and 28 and for oil to be pumped out of these houses which is highly undesirable because the water which is usually salty tends to dilute the oil and cause corrosion of the gears and the leakage of oil from the housing is undesirable because it can effect the flavor of the fish. To prevent this, sealing devices 92—92 are mounted to the inner sides of the walls 22—22 through which the ends of the shaft 82 passes into the respective housings 26 and 28. The sealing devices comprise back-to-back sealing members which operate effectively to prevent fluid from flowing along the shaft in either direction.

It is desirable to be able to move the cutting edge of the knife up or down relative to the axis of rotation of the feed roll so that the filleting can be commenced early or late, depending upon the length of the fish and this is accomplished by shortening or lengthening the effective length of the rod 78.

It is also desirable to adjust the position of the pinch roll with reference to the feed roll to take up for wear. This is achieved without disrupting the drive by mounting the ends of the shaft 64 of the pinch roll in eccentrics 92—92 supported by arms 94—94 for arcuate movement on studs 96—96 which extend through an arcuate slot 98—98 in the arms 94—94. There are screws 100—100 on the studs 96—96 by means of which the arms may be fixed in a predetermined position of angular movement and recesses 102—102 in the arms for receiving a tool so that the arms may be moved arcuately in one direction or the other after loosening the screws 100—100 to shift the shaft 64 and the pinch roll relative to the feed roll.

During the cutting operation, the knife is oscillating reciprocally so as to afford suitable cutting action. There is at times some tendency for the fish to become caught or lodged between the opposite ends of the knife and the side walls and, to minimize this, the plates 24—24 are provided with recesses 134—134, FIG. 3, so that the opposite ends of the knife alternately move first into one recess and then into the other recess to effect cutting of any of the flesh which may have worked its way into the space between the ends of the knife and the side walls.

As previously referred to, the conveyor frame 12 is of articulated construction comprising portions 42 and 44 articulated at 104 which enables changing the angle between the portion 42 and the portion 44. The frame portion 42 is supported intermediate its length by spaced parallel bars 106—106 pivotally connected at one end 108—108 to the portion 42 and provided with slots 110—110 at their opposite ends which are pivotally connected by bolt and nut means 112—112 to legs 8—8. This enables moving the section 42 up or down to change the angle of inclination. The forward end of the section 44 is telescopically recessed into recesses 114—114 at the inner side of the plates 24—24 and detachably secured thereto by screw bolts 116-116. Thus, the conveyor 14 then can be detachably removed from the main frame 10 for adjustment and cleaning purposes without requiring disassembly of any portion of the main frame and its supported parts. The conveyor belt B is of continuous length and is entrained about rollers 118, 120 and 130. The roller 118 is driven by a motor M2 by way of a sprocket 122 fastened to the motor shaft, a sprocket 124 fastened to the roller 118 and a chain 126 entrained about the sprockets 122 and 124. The motor M2 is mounted on a bracket plate 128 containing vertical slots 130 and this bracket is, in turn, mounted on a plate 132 containing horizontal slots 134 which thus enable adjusting the motor longitudinally of the frame portion 42 and vertically with respect thereto.

The discharge conveyor 18 is a continuous belt entrained at its ends about rollers 136 and 138 rotatably mounted at the ends of the conveyor frame 16 and the latter is supported between spaced parallel plates 140—140 containing slots 142—142 so that it may be disposed at a suitable angle. Threaded nuts 144—144 at opposite sides provide for fixing the conveyor frame 16 in a predetermined position of adjustment.

In operation, fish which have been split in half are placed upon the conveyor portion 42 with the skin side down and the tail ends upwardly, whereupon they are carried upwardly by the conveyor portion 42 onto the conveyor portion 44 and the latter then carries them tail-first downwardly onto the surface of the feed roll 32. As the tail ends move from the lower end of the conveyor portion 44, any tendency for them to droop or follow the surface of the conveyor downwardly is prevented by the jets 48 of water which blow them away from the surface of the conveyor and cause them to be moved onto the upper surface of the feed roll slightly forwardly of the top thereof so that there is assurance that they will travel downwardly on the forward side of the feed roll into the nip between the feed roll and the pinch roll. As the tails of the fish enter the nip of the feed roll and the pinch roll through the mechanism previously described, it brings the knife forwardly into a position to engage the flesh surface of the fish, thus stripping the flesh from the skin. The skin travels downwardly between the feed roll and the pinch roll and is gravitationally discharged from the machine into a suitable receptacle therebelow whereas the flesh is discharged forwardly over the surface of the knife onto the discharge conveyor.

It should be understood that the present disclosure is for the purpose of illustration only and includes all modifications or improvements which fall within the scope of the appended claims.

What is claimed is:

1. In a fish skinning machine, a reciprocal knife, a feed roll and a pinch roll, said feed roll and pinch roll being arranged to receive the tail end of a fish and pull it downwardly against the knife to split the flesh from the skin, kinematic means for driving the feed roll and pinch roll and for effecting reciprocation of the knife, conveyor means for delivering the fish skin side down and tail first to the upper surface of the feed roll for downward movement thereon into the nip between the feed roll and the pinch roll, means for driving the conveyor means independently of said kinematic means, means associated with said kinematic means operative when the tail of the fish enters the nip between the feed roll and pinch roll to effect movement of the cutting edge of the knife from a remote position into engagement with the flesh side of the fish as the tail is pulled downwardly by the feed and pinch rolls, and means situated below the feed roll and conveyor in a position to discharge jets of fluid upwardly between the feed roll and the conveyor means against the underside of the fish as it travels from the discharge end of the conveyor means onto the surface of the feed roll to support the tail end of the fish as it travels across the gap from the underside of the conveyor means to the upper side of the feed roll.

2. A fish skinning machine according to claim 1 comprising a mobile frame supporting the component parts thereof, said frame being provided with wheels to enable trundling the machine from place to place.

3. A fish skinning machine according to claim 1 wherein the means for moving the knife to bring the cutting edge into engagement with the flesh side of the fish is actuated by the reactive torque imparted to the feed roll when the tail end of the fish enters the nip between the feed roll and pinch roll.

4. A fish skinning machine according to claim 1 wherein the axis of the feed roll is parallel to the cutting edge of the knife and there is means for oscillating the knife parallel to the feed roll while held in cutting position adjacent the surface thereof.

5. A fish skinning machine according to claim 4 comprising means defining spaced parallel side walls between which the feed roll is journaled for rotation, said side walls confining the lateral disposition of the fish as they travel across the feed roll into the bight between the feed roll and pinch roll, said side walls containing recesses located at the opposite ends of the knife and said knife being of such length that its ends alternately enter the recesses at first one side and then the other as it oscillates.

6. A fish skinning machine according to claim 3 wherein the means for moving the knife to bring its cutting edge into engagement with the flesh side of the fish is adjustable to raise or lower the edge relative to the nip between the feed roll and the pinch roll.

7. A fish skinning machine according to claim 1 wherein the cutting edge of the knife is beveled on its underside.

8. A fish skinning machine according to claim 4 comprising means defining gear housings at opposite ends of the feed roll within which the opposite ends of the feed roll are journaled for rotation, a shaft supporting the knife for oscillating movement parallel to the feed roll, the ends of which extend through bearings into the gear housing and sealing glands encompassing the ends of the knife shaft where they extend through the bearings into the gear housings comprising back-to-back sealing members which prevent fluid from flowing in either direction through the bearings.

9. A fish skinning machine according to claim 1 wherein the pinch roll is supported below the knife adjacent the feed roll and there is means for adjusting the spacing between the surface of the pinch roll and the surface of the feed roll.

10. A fish skinning machine according to claim 9 wherein said means are eccentrics at opposite ends of the pinch roll shaft within which the ends of the pinch roll shaft are journaled so arranged as to move the pinch roll relative to the feed roll without disrupting the drive.

11. A fish skinning machine according to claim 7 wherein there is a main frame supporting the feed roll, pinch roll, knife and driving structure and a secondary frame supporting the conveyor means and means for detachably attaching the secondary frame to the main frame of the machine.

12. A fish skinning machine according to claim 5 wherein the side walls comprise portions of the main frame and contain at their inner sides recesses and the conveyor is mounted to a secondary frame provided with spaced parallel attaching plates adapted to be telescopically engaged within said recesses so as to be detachably attached to the main frame with the conveyor properly positioned with respect to the feed roll.

13. A fish skinning machine according to claim 1 wherein the conveyor is an endless belt supported by an articulated frame such as to enable positioning a portion of its length at an angle to another portion thereof.

14. A fish skinning machine according to claim 1 wherein the conveyor is a flexible belt comprising a conveyor frame, rollers at the ends of the conveyor frame for supporting the belt and means mounting one of the rollers for movement toward and from the other to enable tensioning the belt.

15. A fish skinning machine according to claim 2 comprising a drive motor, a support supporting the motor for movement perpendicular to the conveyor frame, a sprocket fixed to one end of one of the rollers for effecting rotation thereof, a sprocket fixed to the motor shaft and a chain entrained about the sprockets.

16. A fish skinning machine according to claim 1 wherein the space between the surface of the feed roll and the cutting edge of the knife is designed to skive the skin from the flesh so that the skin passes downwardly through the open space and the flesh passes over the knife and discharge conveyor means for receiving the flesh stripped from the skin.

17. A fish skinning machine according to claim 16 wherein the knife is located at the downwardly moving side of the feed roll at approximately the level of the axis of rotation of the feed roll.

18. A fish skinning machine according to claim 1 wherein the discharge end of the feed conveyor is located above and at the upwardly moving side of the feed roll such that the fish are deposited on the top surface of the feed roll.

19. A fish skinning machine according to claim 1 wherein the feed roll is knurled.

20. A fish skinning apparatus according to claim 2 wherein the mobile frame is provided with supporting legs two at the front and two at the back and wheels mounted to the lower ends of the front legs.

* * * * *

UNITED STATES PATENT AND TRADEMARK OFFICE
CERTIFICATE OF CORRECTION

PATENT NO. : 4,250,594
DATED : February 17, 1981
INVENTOR(S) : Ronald A. Mitchell It is certified that error appears in the above-identified patent and that said Letters Patent are hereby corrected as shown below:

Column 2, line 37, change "filleted" to --skinned--

Column 4, line 44, change "filleting" to --skinning--

Column 6, line 26, change "underside" to --upper side--

Signed and Sealed this

Second Day of June 1981

[SEAL]

Attest:

RENE D. TEGTMEYER

Attesting Officer

Acting Commissioner of Patents and Trademarks